United States Patent Office 3,025,911
Patented Mar. 20, 1962

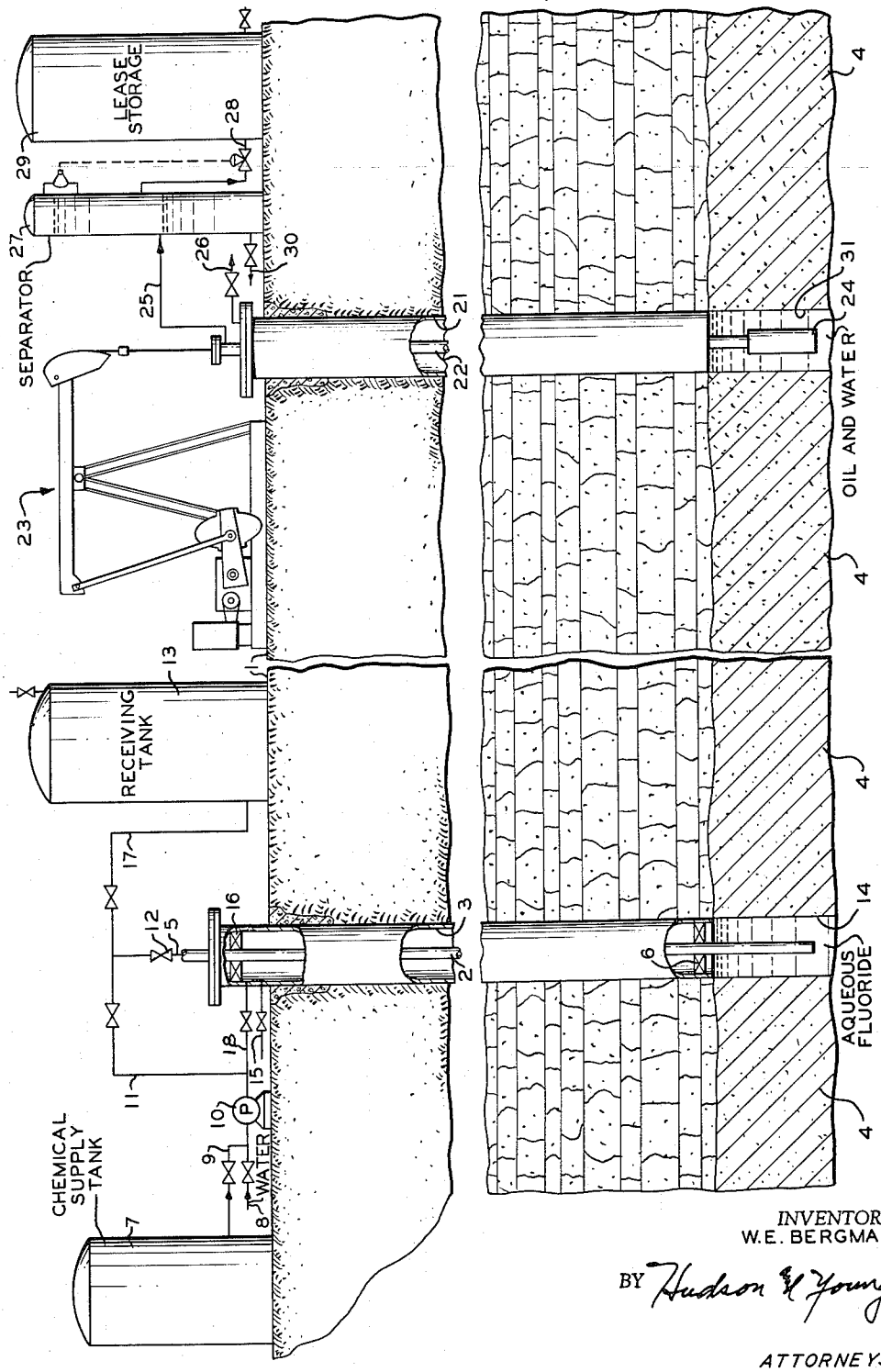

3,025,911
TREATMENT OF OIL BEARING FORMATIONS
William E. Bergman, Bartlesville, Okla., assignor to Phillips Petroleum Company, a corporation of Delaware
Filed Jan. 27, 1958, Ser. No. 711,473
8 Claims. (Cl. 166—42)

This invention relates to production of oil from subterranean oil bearing formations. In one aspect it relates to the production of oil from subterranean oil bearing formations containing clay. In another aspect it relates to a method for increasing the permeability of water and/or oil bearing formations containing clay to the flow of oil and/or water.

The term clay as used throughout this specification and claims is intended to include the shale substance as well as the clay substance, since chemically shale and clay possess many similarities.

Some of the problems encountered when oil producing formations are subjected to secondary recovery by waterflooding are attributed to the presence of clays in the porous oil bearing formations. For example, when the clay containing formation is flooded with fresh water, the clay can hydrate, swell, or disperse with the result that the permeability of the formation to the flow of water is decreased. As a result of the decrease of permeability, less water can be passed through the formation at a given injection pressure. Various treatments have been proposed to circumvent the difficulties attributed to the presence of clays in such porous formations.

An object of this invention is to provide a method of increasing the permeability of clay containing, water and/or oil bearing formations to the flow of water and/or oil.

Another object of this invention is to provide a relatively inexpensive and simple method for increasing the permeability of clay containing water and/or oil bearing formations to the flow of water and/or oil.

Another object of this invention is to provide a method of secondary recovery of oil from oil bearing formations by waterflooding whereby the permeability of the water and/or oil bearing formations to the flow of water and/or oil is increased.

Still another object of this invention is to provide a method for increasing the permeability to the flow of water and/or oil of a water and/or oil bearing formation in the vicinity of an oil producing well wherein clay from a drilling mud has penetrated the water and/or oil bearing formation.

Still other objects and advantages of this invention will be realized by those skilled in the art upon reading the following specification and attached drawing which describes and illustrates preferred embodiments of my invention.

The FIGURE illustrates apparatus and its arrangement suitable for carrying out my invention.

My invention comprises a method for increasing the permeability to the flow of water and/or oil of a water and/or oil containing formation also containing clay comprising injecting an aqueous solution of an inorganic, water soluble fluoride into said formation, said aqueous solution having a pH of about 5 to about 10.

My invention further comprises a method for increasing the permeability to the flow of water and/or oil of a water and/or oil bearing formation containing clay comprising injecting an aqueous solution of an inorganic, water soluble fluoride into said formation, said aqueous solution having a pH of about 5 to about 10, said aqueous solution containing a sufficient amount of said fluoride to increase said permeability of the formation, and said fluoride being selected from the group of fluorides consisting of the alkali metal fluorides, ammonium fluoride and hydrogen fluoride.

By the practice of this invention clay contained in water and/or oil bearing formations is treated with an aqueous solution containing fluoride ion. These solutions are about neutral, that is, they range from a pH of about 5 to a pH of about 10 to 12. By the term "about neutral" I mean a pH range from about 5 to about 10 to 12. When the fluoride ion contacts the clay, a chemical reaction takes place which is represented by the following equation:

$$(Clay \cdot OH) + NaF \rightarrow (Clay \cdot F) + NaOH$$

From this reaction it is seen that the hydroxyl ions attached to the clay structure are replaced by fluoride ions. As a result of this reaction, the characteristics of the clay, which include the degree of solvation or hydration, are materially altered. This alteration, in turn, affects the hydrophilic characteristics of the clay and hence the degree to which the clay can hydrate or disperse and can decrease the permeability of the porous clay containing formation. It should be emphasized that the reaction expressed by the equation given above and which represents an irreversible exchange of hydroxyl ions is restricted to exchange with fluoride ions under the above stated pH conditions. For the conditions under which clay containing formations would be treated according to this invention, that is, in subterranean water and/or oil bearing formations, exchange of hydroxyl ions with such anions as chloride, bromide, sulfate, nitrate and silicate is believed not to take place. For the practice of this invention clay containing formations are treated merely by injection of an aqueous solution prepared by dissolving one or more water soluble inorganic fluoride salts in water. The pH of these water solutions should be about 7, that is, about neutral. Too much free acid in the fluoride solution may nullify the beneficial effects of the ion exchange. In fact, hydrofluoric acid of acidity much greater than a pH of 5 is of little or no value for the practice of this invention because its injection into an oil bearing formation results in the production of $SiF_4$ (silicon tetrafluoride), which, in the presence of water, hydrolyzes to silicic acid and silicic acid is a severe plugging agent. Thus, it is preferable to use an approximately neutral solution of the fluoride for treatment of the clay according to the invention such as solutions having a pH of about 5 to slightly higher than 7, i.e., 10 to 12.

While it is preferred to use aqueous fluoride solutions which are about neutral, alkaline solutions of pH as high as 10 to 12 are used under some conditions. However, it is preferred to use approximately neutral solution. In actual practice, the approximately neutral solution which is primarily used is made by merely dissolving a fluoride, such as sodium fluoride, in available well filtered water. River water, well water and the like are used as the medium in which to dissolve the fluoride, provided it is well filtered to remove foreign material which might plug the formation or reduce permeability.

Several methods are employed to treat the oil bearing formation depending upon the particular conditions which prevail and upon the results desired. For example, where the plugging of the formation is believed to be restricted to the portion of the formation adjacent the well bore due to clays from the drilling mud, the treatment merely involves injection for a relatively short distance into the formation of a saturated or relatively concentrated solution of an inorganic water-soluble fluoride, such as sodium fluoride, and the application of sufficient pressure to effect the injection. After permitting injection of the solution into the formation the distance believed penetrated by the drilling mud, which may require as much as several hours of time, injection pressure is released and the solution remaining in the well bore is removed by swabbing, displacement with air or other conventional means. Following this operation the well is completed in the usual manner, as a water producing, a water input or an oil-water output well for the production of oil.

In the drawing, reference numeral 1 refers to the ground surface, through which was drilled an input well 14 cased with a casing 3. This well is provided with a tubing 2 extending substantially to the bottom of the well. A packer 6 seals the tubing to the casing at about the level of the top of a water and/or oil bearing formation 4. To treat the formation in the vicinity of the well bore 14 a relatively concentrated or a saturated solution of an inorganic water soluble fluoride, as sodium fluoride, from a supply tank 7, is passed through a pipe 9 and is pressured by a pump 10 through a conduit 11, conduit 5 and tubing 2, with valve 12 being open into the formation 4 below packer 6. When this treatment is considered sufficient, injection pressure is released and air, from a source not shown, is passed through pipe 15 into the casing with packer 6 being unsealed. This air then passes through the packer and forces the solution from the well bore up the tubing 2 and through conduit 17 into a receiving tank 13. The valve in pipe 17 is open and the valve in pipe 11 is closed. Following this operation the well is completed in the usual manner, as mentioned hereinbefore.

When the invention is applied to the treatment of a water injection well in waterflooding operations, a small amount of an inorganic water soluble fluoride, such as sodium fluoride, is dissolved in the injection water and this solution is injected into the formation through the water input well. It is believed that the benefit derived from the treatment of dirty, clay containing water and/or oil bearing formations is more or less proportional to the concentration of the fluoride ions in the injection water or to the total content of fluoride ions introduced into the formation. For maximum results, that is, for maximum and rapid increase of permeability, a saturated aqueous solution of the fluoride is used. In waterflooding practice, however, it is preferred that the concentration of the fluoride ion be about 1000 p.p.m. (parts per million by weight) or higher when slug or intermittent injection treatment is practiced. For continuous treatment the concentration of the fluoride ion is, in many cases, lower than the concentration just mentioned, for example, the concentration of the fluoride ion is then employed in the range of from 20 to 100 p.p.m.

In waterflooding operations, as mentioned, one method is to inject for a relatively short period of time a relatively concentrated solution of fluoride ion followed by a period of water injection. This period of water injection is relatively long compared to the period of fluoride solution injection. For continuous fluoride treatment, as mentioned, the concentration of the fluoride ion in the water is ordinarily lower than the above-mentioned concentrations for intermittent fluoride treatment since the water containing fluoride is injected for long periods of time. However, even for the operation which is termed continuous fluoride treatment such operation may include injection of an aqueous solution of fluoride containing a small concentration of fluoride ion for such a period of time as from 12 to 24 hours, or a week, for example, after which water without added fluoride is injected for an equal or longer period of time. Following this water injection another injection period using dilute fluoride solution is employed.

For intermittent or continuous fluoride treatment in waterflooding, an aqueous fluoride solution of suitable concentration is passed from supply tank 7 through pipe 9 and is diluted by mixing with waterflooding input water in pipe 8, and the diluted solution is pressured by pump 10 through conduit 11 and tubing 2 with valve 12 being open, into the formation 4 below the sealed packer 6. Water and/or oil from the formation enters an output well bore 31, provided with a casing 21 and pump 24, and is pumped by way of tubing 22 and pipe 25 into a separator 27. Pump 24 is powered by the prime mover portion 23 of the pump assembly. A lease storage tank 29 receives separated oil via pipe 28 from separator 27. Valved pipe 26 is provided for outlet of gas, as desired, while valved pipe 30 is for withdrawal of water from separator 27.

Truly continuous fluoride treatment is not necessary in order to maintain the presence of fluoride on the clay surface, that is, the chemical reaction involving the exchange of hydroxyl ions and fluoride ions is not readily reversible under the conditions which generally prevail in subterranean formations. Continuously or substantially continuous treatment with a dilute aqueous fluoride, however, provides a means by which treatment with fluoride ion is extended for considerable distances from input wells. If desired, particularly in water flooding, the dilute fluoride solution can be pumped from pump 10 through pipe 18 directly into the casing. In this case tubing 2 and packer 6 are not needed.

The particular fluoride compounds used in the practice of my invention include the alkali metal fluorides, ammonium fluoride and hydrogen fluoride. The hydrogen fluoride is ordinarily obtained in the form of an aqueous solution called hydrofluoric acid. However, because the limit of the acidity of the aqueous fluoride solution used in my invention is around pH 5, a hydrofluoric acid solution is diluted with water to a pH of about 5 or very slightly above 5. Or, if desired, the hydrofluoric acid solution is partially neutralized, exactly neutralized or overneutralized by addition of, for example, ammonium hydroxide and/or one or more alkali metal hydroxides. The latter include sodium hydroxide, potassium hydroxide, lithium hydroxide, cesium hydroxide and rubidium hydroxide, and mixtures of two or more of any of these disclosed hydroxides.

The alkali metal fluorides which are used according to my invention are lithium fluoride, sodium fluoride, potassium fluoride, rubidium fluoride and cesium fluoride. Ammonium fluoride is also used in some cases. A mixture of any two or more of these fluorides is also used. Certain of these fluorides, for example, lithium fluoride, are less soluble than other of these fluorides, for example, sodium fluoride. However, all of these fluorides are sufficiently soluble in water to provide a satisfactory fluoride-containing, aqueous solution for increasing the permeability of clay containing, water and/or oil bearing formations to the flow of water and/or oil.

As an example of the utility of my invention a perm plug was cut from an oil well core which was known to contain clay. This perm plug was substantially cylindrical in form, having a diameter of about ¾ inch and a length of about 1¹⁄₁₀ inches (2.75 cm.). When sodium chloride (a 5 percent aqueous solution by weight) was passed through this perm plug, the permeability gradually decreased from a value of about 76 md. (millidarcys) to about 5 md. The term millidarcy is herein abbreviated md. The unit of permeability is the "darcy," a "millidarcy" being ¹⁄₁₀₀₀ of a darcy.

Permeability is defined in "The Flow of Homogeneous Fluids Through Porous Media," pages 74–79, Muskat, McGraw-Hill Book Company, Inc., 1937, as $$K = \frac{Q \mu L}{A \left( \frac{\Delta P}{14.7} \right)}$$

in which Q is the volume of liquid passed through a permeable member per second in milliliters; $\mu$ is the viscosity of the liquid in centipoises; L is the length of the permeable member in centimeters; A is the area of the permeable member exposed to the pressure driving the liquid; P is the driving pressure in pounds per square inch, this pressure in atmospheres being $$\frac{\Delta P}{14.7}$$

For small volumes, for example, 1 milliliter, cubic centimeters can be used without substantial error. The above-mentioned area A is in square centimeters.

A porous material having a permeability of 1 darcy permits passage of 1 cubic centimeter of liquid of 1 centipoise viscosity per second through a material having 1 square centimeter cross section and a length of 1 centimeter under a driving force of 1 atmosphere per square centimeter.

The following tabluation illustrates the effect of the flow of a sodium chloride solution on the permeability of a clay containing perm plug, the effect on the permeability of the flow of distilled water, and the effect of the flow of an aqueous sodium fluoride solution on the permeability of the same perm plug.

flow in cubic centimeters of salt solution or water through the perm plug per second. The next column, p.s.i., is the pressure forcing the fluids through the perm plug in terms of pounds per square inch while the next column gives this pressure in terms of atmospheres. The next to the last column is the permeability of the perm plug during the passage of 1 cubic centimeter increments of each fluid indicated by the third column. In the last column is given the pH of a sample of the fluid collected during each of the various test periods.

In the next horizontal line of this tabulation after the passage of 110 cubic centimeters of the sodium chloride solution through the perm plug, another 1 cubic centimeter sample was taken and this 1 cubic centimeter of sample required 51 seconds for its passage. The 110 cubic centimeters of sodium chloride solution included the original 5 cc., the 1 cc., and then an additional 104 cc.

After passage of a total of 970 cubic centimeters of sodium chloride solution through the perm plug the final 1 cubic centimeter of sodium chloride solution required

| Solution | Total cc. Through | Amount, cc. | Time, Sec. | Q | P.s.i. | Atm. | Md. | pH |
|---|---|---|---|---|---|---|---|---|
| 5% NaCl (by wt.) | 5 | 1 | 37 | .027 | 5.0 | -------- | 76 | 6.6 |
|  | 110 | 1 | 51 | .0196 | 6.3 | .429 | 44 | 6.3 |
|  | 200 | 1 | 75 | .0133 | 6.6 | .4489 | 24 | 6.1 |
|  | 250 | 1 | 108 | .00925 | 6.5 | .442 | 20 | 6.4 |
|  | 300 | 1 | 137 | .0073 | 6.5 | .442 | 16 | 6.2 |
|  | 350 | 1 | 160 | .0063 | 6.5 | .442 | 14 | 6.3 |
|  | 400 | 1 | 184 | .0054 | 6.5 | .442 | 12 | 6.3 |
|  | 450 | 1 | 165 | .0061 | 7.4 | .503 | 12 | 6.5 |
|  | 500 | 1 | 153 | .0065 | 7.3 | .497 | 12 | 6.4 |
|  | 550 | 1 | 200 | .0050 | 7.3 | .497 | 10 | 6.3 |
|  | 750 | 1 | 330 | .0030 | 6.6 | .449 | 6 | 6.3 |
|  | 800 | 1 | 337 | .0030 | 6.6 | .449 | 6 | 6.5 |
|  | 970 | 1 | 423 | .0024 | 6.5 | .442 | 5 | 6.5 |
| Distilled H₂O | 20 | 1 | 1020 | .0010 | 7.0 | .476 | 2 | 8.1 |
| 4% NaF (by wt.) | 20 | 1 | 145 | .0069 | 8.0 | .544 | 14 | 7.9 |
|  | 50 | 1 | 74 | .014 | 8.2 | .558 | 27 | 7.6 |
|  | 100 | 1 | 73 | .014 | 7.8 | .531 | 29 | 7.5 |
|  | 200 | 1 | 83 | .012 | 7.6 | .517 | 25 | 7.5 |
|  | 330 | 1 | 65 | .015 | 8.0 | .544 | 30 | 7.6 |
|  | 430 | 1 | 65 | .015 | 7.8 | .531 | 31 | 7.5 |
|  | 650 | 1 | 31 | .032 | 8.5 | .578 | 60 | 7.6 |
|  | 750 | 1 | 37 | .027 | 8.3 | .565 | 52 | 7.6 |
|  | 900 | 1 | 48 | .021 | 8.4 | .571 | 40 | 7.6 |
|  | 1,000 | 1 | 51 | .020 | 8.4 | .571 | 38 | 7.6 |
|  | 1,100 | 1 | 37 | .027 | 8.8 | .599 | 49 | 7.6 |
|  | 1,200 | 1 | 37 | .027 | 8.4 | .571 | 52 | 7.6 |
|  | 1,300 | 1 | 39 | .026 | 8.4 | .571 | 50 | 7.6 |
|  | 1,500 | 1 | 45 | .022 | 8.2 | .558 | 43 | 7.6 |
| Distilled H₂O | 50 | 1 | 69 | .014 | 8.8 | .599 | 21 | 5.3 |
|  | 100 | 1 | 99 | .010 | 8.8 | .599 | 15 | 5.8 |
|  | 350 | 1 | 370 | .0028 | 9.2 | .626 | 4 | 6.7 |
| 4% NaF (by wt.) | 100 | 1 | 164 | .006 | 9.4 | .639 | 10 | 7.6 |
|  | 150 | 1 | 182 | .0055 | 9.2 | .626 | 9 | 7.6 |
|  | 300 | 1 | 412 | .0024 | 8.4 | .571 | 5 | 7.7 |

In this tabulation it is noted that after passage of the sodium fluoride solution through the perm plug, water flowed through the plug much more easily than when water followed the sodium chloride treatment. Thus, after passage of 50 cc. water (following the NaF treatment) only 69 seconds were required for passage of 1 additional cc. of water whereas following the NaCl treatment, and after passage of only 20 cc. water, 1,020 seconds were required for passage of 1 additional cc. of water through the plug. From the point of view of the permeability for the passage of the water following the NaCl treatment, the permeability of the perm plug was 2 md. in contrast to 21 md. for passage of water following the sodium fluoride treatment.

It is thus obvious that passage of sodium fluoride increased the permeability of the porous plug to the flow of water following treatment with an aqueous sodium fluoride.

In the above tabluation the second vertical column gives the total flow of water, sodium chloride or sodium fluoride solution in cubic centimeters through the perm plug. For example, after passage of 5 cubic centimeters (col. 2) of the sodium chloride through the perm plug, 1 cubic centimeter (col. 3) was caught in a separate container and 37 seconds of time (col. 4) were required for the passage of this separate 1 cubic centimeter of sodium chloride solution. The fifth column, Q, is the 423 seconds of time for its passage. Next, distilled water was passed through the perm plug and after passage of 20 cubic centimeters through the plug, the passage of 1 cubic centimeter required 1020 seconds of time. This long or increased time illustrates that distilled water even after passage of a sodium chloride solution through the clay containing perm plug was markedly restricted by the presence of the clay. Following the passage of the distilled water a 4 percent aqueous sodium fluoride solution was passed through the plug. After passage of about 20 cubic centimeters through the plug, a 1 cubic centimeter sample was taken which required 145 seconds for its passage. The permeability in terms of millidarcys for this 1 cc. sample was 14. It should be noted after further passage of the sodium fluoride solution through the perm plug shorter periods of time were required for the passage of 1 cubic centimeter of the sodium fluoride solution. Next, distilled water again was passed through the perm plug and it is noted that upon continued passage of distilled water through the plug, the flow of the water was restricted and is shown by the progressive decrease in the values of the permeability in millidarcys. Following this last or final observation in the passage of distilled water through the perm plug, another quantity of 4 percent sodium fluoride solution was passed through the plug and it is noted that the permeability in terms of millidarcys was increased to 10 after passage of 100 cubic centimeters of the fluoride solution.

As an example of the application of my invention to treating a clay containing permeable formation adjacent a well bore, a 4% by weight aqueous NaF solution is prepared. This solution is pumped down a tubing into the well at such a rate as to maintain a pump pressure of 185 p.s.i.g. (pounds per square inch gage) for 12 hours. After this period of time the pump prsesure is released and air is blown down the annulus between the tubing and casing, with a packer at a level slightly above the top of the formation being released, and the unused fluoride solution is blown up the tubing into a receiving tank for saving the unused solution. The well, thus treated, is ready for completion in the usual manner as a water-producing, a water input or an oil-water output well for the production of oil.

As a second example, in a water flooding secondary recovery operation, 50 p.p.m. by weight aqueous solution of sodium fluoride is prepared and pumped into a water input well at the rate of 10 bbls. (barrels) per hour for a 48-hour period. Pumping pressure decreases from a beginning pressure of 120 p.s.i.g. to a pressure of 90 p.s.i.g. after 4 hours. The pump pressure remains at about this value for the remainder of the 48-hour period. Oil and water enter an output well spaced at about 150 feet from the input well and are produced therefrom and are pumped into an oil and water separator tank for separation of the oil from the water.

While certain embodiments of the invention have been described for illustrative purposes, the invention obviously is not limited thereto.

The increase in permeability of porous water and/or oil bearing formations containing clay affected by treatment with an aqueous solution of one or more of the above-mentioned inorganic fluorides, in actual operation, permits an increased volume flow of water through the formation without need for increasing the water injection pressure. In some cases even lower water injection pressures give greater water flow rates through the formation than the pressures used prior to the fluoride treatment.

It is believed, also that treatment of formations as herein disclosed also increases the permeability of the clay or shale containing formations to the flow of such gases as air, and constituents of natural gas, such as methane, ethane, etc.

I claim:

1. In a method for improving the permeability of a clay-containing subterranean formation, which has been contacted with water in a water flooding operation and wherein the permeability of said clay-containing formation for water and oil decreases due to swelling of the clay therein by said water, the improvement comprising injecting an aqueous solution of a water soluble fluoride selected from the group of fluorides consisting of lithium fluoride, sodium fluoride, potassium fluoride, cesium fluoride, rubidium fluoride, ammonium fluoride, and a reaction product of hydrogen fluoride with a hydroxide of a metal selected from the group of hydroxides consisting of lithium hydroxide, sodium hydroxide, potassium hydroxide, cesium hydroxide, and rubidium hydroxide into said formation, said aqueous solution having a pH between about 5 and 12 and said aqueous solution containing a sufficient amount of said fluoride to increase the permeability of said formation to a value greater than said low permeability.

2. In a method for improving the permeability of a clay-containing subterranean formation, which has been contacted with water in a water flooding operation and wherein the permeability of said clay-containing formation for water and oil decreases due to swelling of the clay therein by said water, the improvement comprising injecting an aqueous solution of an inorganic, water soluble fluoride into said formation, said fluoride being selected from the group of fluorides consisting of alkali metal fluorides, ammonium fluoride and hydrogen fluoride, said aqueous solution having a pH between about 5 and 12 and said aqueous solution containing a sufficient amount of said fluoride to increase the permeability of said formation to a value greater than said low permeability.

3. The method of claim 1 wherein said fluoride is sodium fluoride.

4. The method of claim 2 wherein said fluoride is sodium fluoride.

5. The method of claim 2 wherein said fluoride is potassium fluoride.

6. The method of claim 2 wherein said fluoride is lithium fluoride.

7. The method of claim 2 wherein said fluoride is ammonium fluoride.

8. The method of claim 2 wherein said fluoride is hydrogen fluoride.

References Cited in the file of this patent
UNITED STATES PATENTS

| | | |
|---|---|---|
| 2,094,479 | Vandergrift | Sept. 28, 1937 |
| 2,531,451 | Maier | Nov. 28, 1950 |
| 2,652,360 | Bond et al. | Sept. 15, 1953 |
| 2,675,083 | Bond et al. | Apr. 13, 1954 |
| 2,761,835 | Brown | Sept. 4, 1956 |
| 2,841,222 | Smith | July 1, 1958 |